(12) United States Patent
Littlestar et al.

(10) Patent No.: US 11,841,293 B2
(45) Date of Patent: Dec. 12, 2023

(54) IN LINE INSPECTION STRAIN DEVICE METHOD AND APPARATUS FOR PERFORMING IN LINE JOINT INSPECTIONS

(71) Applicant: SMART PIPE COMPANY, INC., Houston, TX (US)

(72) Inventors: Gary Dean Littlestar, Houston, TX (US); Christopher Dean Littlestar, Houston, TX (US); Aron Robert Ekelund, Houston, TX (US); Ivan Capistran Mandich, New Orleans, LA (US)

(73) Assignee: SMART PIPE COMPANY, INC., Houston, TX (US)

(*) Notice: Subject to any disclaimer, the term of this patent is extended or adjusted under 35 U.S.C. 154(b) by 511 days.

(21) Appl. No.: 17/185,783

(22) Filed: Feb. 25, 2021

(65) Prior Publication Data

US 2021/0262888 A1 Aug. 26, 2021

Related U.S. Application Data

(60) Provisional application No. 62/981,155, filed on Feb. 25, 2020.

(51) Int. Cl.
*G01M 3/28* (2006.01)
*H04W 4/80* (2018.01)
(Continued)

(52) U.S. Cl.
CPC ......... *G01M 3/2861* (2013.01); *E21B 47/007* (2020.05); *G01M 3/2815* (2013.01);
(Continued)

(58) Field of Classification Search
CPC .... G01M 3/28; G01M 3/2807; G01M 3/2861; G01M 3/2815; G01M 3/2853;
(Continued)

(56) References Cited

U.S. PATENT DOCUMENTS

| 8,113,242 B1 | 2/2012 | Bennett |
| 2006/0162429 A1* | 7/2006 | Omer ................. G01M 3/2815 73/49.1 |

(Continued)

FOREIGN PATENT DOCUMENTS

| WO | WO-2011083007 A1 * | 7/2011 | ............ G01M 3/047 |
| WO | WO-2016108695 A1 * | 7/2016 | .......... G01M 3/2861 |

*Primary Examiner* — Benjamin R Schmitt
(74) *Attorney, Agent, or Firm* — Juan J. Lizarraga (57) ABSTRACT

A system and method to inspect and monitor stress, strain, leakage, corrosion and disjointing of rigid metallic and non-metallic connector fittings used to join sections of non-metallic flexible reinforced thermoplastic pipe (RTP), as well as inspecting and monitoring the structural health of RTP in the area of connections with casement shields concentrically mounted on and adhered to the outer surface of the RTP at or adjacent to connection with a rigid connector fitting, monitoring sensors installed in the casement shields, a management system for receiving, processing and transmitting information gathered from the sensors via SCADA or other computerized means for monitoring and regulating strain impact, determining stress level and direction, potential leaks and temperature spikes at connector fitting areas, and a mechanism for acoustical detection or simulation, with a computer system for receiving, processing and transmitting information gathered from acoustical micro packs on the casement shields.

9 Claims, 6 Drawing Sheets

(51) Int. Cl.
*E21B 47/007* (2012.01)
*E21B 47/01* (2012.01)
*E21B 17/02* (2006.01)
*E21B 17/08* (2006.01)

(52) U.S. Cl.
CPC ........... G01M 3/2853 (2013.01); H04W 4/80 (2018.02); *E21B 17/02* (2013.01); *E21B 17/08* (2013.01); *E21B 47/01* (2013.01)

(58) Field of Classification Search
CPC . G01M 5/0058; G01M 3/2869; E21B 47/007; E21B 17/02; E21B 17/08; E21B 47/01; G01L 1/2206; G01N 17/04
See application file for complete search history.

(56) References Cited

U.S. PATENT DOCUMENTS

| | | | |
|---|---|---|---|
| 2010/0148766 A1* | 6/2010 | Weischedel | G01N 27/9006 324/238 |
| 2013/0160886 A1* | 6/2013 | Wright, Jr. | G01M 3/283 73/40.5 R |
| 2015/0330206 A1* | 11/2015 | Trillon | G01N 29/2412 29/428 |
| 2016/0169767 A1 | 6/2016 | Raghavendra et al. | |
| 2016/0349142 A1* | 12/2016 | Hengen | G01M 3/183 |
| 2021/0025530 A1 | 1/2021 | Littlestar et al. | |

* cited by examiner

TYP.SECT.A-A

IN LINE INSPECTION STRAIN DEVICE METHOD AND APPARATUS FOR PERFORMING IN LINE JOINT INSPECTIONS

This application relates to the subject matter of the family of the U.S. patents, and it completes the ILI (In Line Inspection Method and Apparatus Performing "In Line Inspections"), for multi layered flexible composite pipelines Smartpipe® including:

U.S. Pat. No. 5,551,484 Pipe Liner and Monitoring System,

U.S. Pat. No. 7,374,127 System and Methods for Making Pipe Liners"

U.S. Pat. No. 7,258,141 Pipe Liner Apparatus and Methods"

U.S. Pat. No. 8,567,44882 Methods and Systems for In-Situ Pipe Lining"

U.S. Pat. No. 8,567,45082 In-Situ High Pressure Pipe Manufacture"

U.S. Pat. No. 9,310,01482 Pipe and Systems and Methods for Making Pipe for Installation in a Pipeline"

U.S. Pat. No. 9,453,606 Movable Factory for Simultaneous Mobile Field Manufacturing and Installation of Non-Metallic Pipe"

U.S. Pat. No. 10,288,207 B2 In Line Inspection Method and Apparatus Performing In Line Inspections"

U.S. Pat. No. 10,436,667 In Line Inspection Method and Apparatus Performing In Line Inspections"

Non-metallic and partially metallic Reinforced Thermoplastic Pipe (hereinafter designated as "RTP") systems for the transport of liquid hydrocarbons, natural gas, hydrogen and water require a different type of monitoring and inspection from the magnetic field system utilized in the inspection of steel pipelines. U.S. Pat. Nos. 10,288,207 and 10,436,667 for In Line Inspection Method and Apparatus Performing In Line Inspections, (hereinafter designated as "ILI") provide an inline inspection system to assess the integrity of non-corrosive, non-metallic reinforced or partially metallic reinforced composite pipe, providing for continuous length inspection and monitoring. This novel In Line Inspection Strain Device (hereinafter designated "ILISD") is specifically designed for the inspection and monitoring of the stress, strain, leakage, corrosion and disjointing of the metallic or non-metallic connectors utilized to join sections of flexible RTP, as well as inspecting and monitoring the structural health of the RTP systems in the area of those connections. The nature of the connection of flexible RTP and the rigid connection fittings, in the composite pipeline industry has proven to be the weakest structural detail in a composite pipeline, whereby the stress concentration exhibited at the rigid connector's contact point causes dislocations, pulling out, and deviations in torque and bending, resulting in catastrophic failures of the pipeline. This ILISD novelty represents a completion of the ILI monitoring system by combining the patented ILI system with this novel device for monitoring and inspecting the rigid connection points in a single apparatus. These patents are incorporated here by reference. It should be noted that the specific product Smartpipe" RTP (a multi layered composite pipe) is a patented invention and that this patent application conforms to the extended art of that invention where this invention compliments the original product, and adds a novel application to facilitate an existing industry need to control pipeline over-pressure and surge pressures utilizing a composite pipe-based device, and with this patent adds to the controlled inspection of the joints and connections that are standard to all composite pipelines. This invention is designed to fill the current technology gap whereby it has not been possible to inspect the rigid connectors between flexible RTP segments, where the highest stress concentration is located, in order to prevent leakage and catastrophic failures of such pipelines. It is important to note that the system is in continual monitoring mode where it is possible for the operator to obtain the test data at any time, to make informed decisions and take preventative actions. This novel system has not been available in the RTP composite pipe industry until now. This novel system is designed to be integrated with the industry's existing and future RTP pipeline systems, to be installed on the pipe in a new installation or retrofitted onto an existing installed RTP pipeline.

BACKGROUND

The RTP composite pipeline industry has grown exponentially over the past 25 years, and there are now thousands of kilometers of RTP in service around the world. These non-metallic flexible, high pressure systems transport liquid hydrocarbons, natural gas, hydrogen, water and most anything else that has been traditionally transported by steel pipelines. The systems are non-corroding and, properly installed and maintained the RTP systems generally have good track record. The problem with the systems, however, is that there is a fundamental weak point in all RTP systems. The flexible RTP must be terminated, joined, valved and otherwise controlled and managed by rigid metallic or non-metallic fittings and other appurtenances. Terminating the flexible RTP into these rigid connectors naturally creates stress concentrations that are carefully engineered for long term safe operations. Over time, however, these connections can weaken from aging, temperature changes, soil conditions, moisture and combined lateral and tensile stresses on the pipe, resulting in leaks and eventual catastrophic failure of the pipeline. Recent catastrophic failures have highlighted the RTP industry's connector issue, and there is no present solution to the problem. Thousands of these buried connectors already exist and thousands more will be installed, with no existing technology to inspect these critical connections. Personal safety and environmental security are threatened by pipelines that cannot be monitored and periodically inspected by operators and pipeline regulators. This invention relates to a method and structurally inventive system, construction or mechanism to facilitate such monitoring and inspection of the composite, flexible structures and the rigid connectors into which they are installed. This invention contains embedded instrumentation for detection, monitoring, equipment activation and deactivation of paired inventive systems. Although the system is comprised of composite pipe elements, it can also be installed independently into a steel pipe system. All components are designed and assembled as a package that includes sensors, method of attachments designed to the specific pipeline requirements, and are user friendly for installation and operation in existing and new pipelines.

This novel ILISD device is not currently available in the industry, and this invention can be provided in the form of a prefabricated assembly, to be readily transported to site. Added as an appurtenance to pipelines, this system will inform the operator of critical data required to manage these critical connection components. The pressure, pressure concentrations, surges, and anomalies resulting from the fluid and gas transports in the pipelines, have a variety of stress and strain distribution, and it was found in the industry that the highest risk portions of pipelines are the connectors, by definition classified as contributing elements of the fluid or gas transport losses. The force derived from such activity is not observed by a measurable detection and it is not predictable in the pipelines. Resolving this effect is mitigated by the ILISD component added to the ILI system completing inspection and monitoring of the connectors with the balance of the pipeline. The novelty of this invention is found to be the most useful in RTP pipelines and their flexible connectors where there is a need to compensate for stress and energy absorption due to the localized stress concentration and movements. It was experienced that such flexible connection points, are primary cause of the breaks, and those points are the most exposed to a time fatigue performance. The rigid steel pipelines are rather brittle and subject to sudden break at the connectors and their performances are detected at the moment of the break. Where there is a movement in both rigid and flexible connections, or in combinations, these two different modes of interaction will be detected with the ILISD system.

Industry standards or performance allowances by authorities that regulate pipelines require at least the same performance standards for the connectors as prescribed for the pipelines. Industry experience shows that the axial and lateral stress concentrations at the connectors may greatly exceed this requirement and that the connector locations are at an unacceptable risk of failure without continuous monitoring and periodic inspections comparable to steel pipeline requirements.

The ILISD inventive system is equipped with electronic monitoring sensors which determine the stress level and direction, potential leaks and temperature spikes at connector locations, as a part of the pipeline's total monitoring and inspection dataset. Prior to delivery the ILISD is tested and certified as part of the system's manufacturing procedures.

The ILISD computer system processes the collected data, building a baseline model of all of the pipeline's connectors, in order to identify future changes at each connector site. This provides the information necessary for the operator to devise an effective integrity management program for the pipeline, repairing or replacing a potential failing connector prior to an actual leak or catastrophic failure.

SUMMARY OF THE INVENTION

The inventive system and methods for monitoring and inspection of a control of the connection points of composite pipelines by means of the in-line installation of the ILISD system is a novel method and apparatus which is currently non-existent in the pipeline industry. The ILISD is a novel component of the previously issued patent for ILI monitoring system, and as such, it completes the overall inspection and monitoring system of the pipelines. The ILISD product, is a pre-designed element for continuous monitoring and periodic inspection of the connections in the composite pipelines.

The inventive ILISD system is a non-intrusive component device, and as a fully assembled piece, it is installed at one or more places at designated points of the pipeline and at the connectors. The ILISD function will inform about the stress at a point of a critical connection or connector and it will record the state of that connector. The designed ILISD system can be specific to a particular connection and applicable in a variety of conditions with adequate sensor devices in the best configuration to interpret the structural health of the connection. The continuation and coordination with the pipeline in line inspection system is beneficial in determining the condition of the overall health of the pipeline. The advantage of the ILISD device is that it allows inspection during the normal operation of the pipeline with the In Line Inspection System for a complete inspection of the pipeline and its connection points with no disruption of the flow or normal use of the pipeline. The system or individual components can be replaced as needed, without disrupting operations. Multiple combinations are possible including installations above ground, within a building, underground, in conduits, culverts, and within the host pipelines and conduits.

The inventive system also provides the ILISD product as a standby manufactured device for the pipelines, which is stored and ready to be used in case of emergency as would be required by customers. It is also equipped with multiple sensors and a monitoring system. The ILISD devices as designed are an accommodation of the RTP Smartpipe® composite pipe in its entirety for inspection of the line-pipes to the connectors.

An important feature of this inventive ILISD device is a predictability of failure mode by which an operator can develop remediation plans to prevent failure of the connections. The ILISD product installation and could be implemented during the original construction of a pipeline, or retrofitted on an existing pipeline. It is clear that such pre-emptive implementation of the ILISD device would be beneficial to pipeline integrity management.

The inventive system for the ILISD device for pipelines is described with the following inclusions of the drawings and noted items or the components for better understanding of this first-to-file" document designated as the figures from 1 through 12c.

It is an objective of this invention to provide an apparatus for ILISD integrating system with the ILI capable of detecting a stress concentration in the pipeline's connections, and together with the entire in line pipeline inspection completing a total inspection of the pipeline and all components. The ILISD device is claimed to be an invention in its entirety, either manufactured and assembled, ready for transportation to the site for installation, or constructed at the site of the connector. It is further intended to provide such an ILISD system with the monitoring components and sensors where the ILISD device has the reporting quality of relating stress concentrations, dislocations and torques from operation of the pipeline, informing the user of the potential connector problems in the pipeline alerting the operator of the need for remedial actions and to make necessary repairs.

It is further intended to provide the means of constructing several types an d methods of combining ILISD devices in different configurations, e.g. above ground, below ground and in industrial processing pipelines and conduits.

It is further intended that the novel use of this inventive system is also applicable in Smartpipe® ° C."-shape reduced cross sections for a later processing in the pipelines.

It is further intended that the novel method of the new pipeline designed structures may require a multiplicity of inner composite liners in a concentric configuration. ILISD devices would have installation inside the layers at the connections to inspect and report the total condition of the pipes and fittings.

It is further intended that proprietary computer hardware and software is also a part of the inventive system to be used in theoretical modeling as well as in the programming of the connector systems within the ILISD device alone and in combination with the ILI system. This inventive instrumented ILISD device is also sensitive to data collection relative to the connectors and the pipeline function. The novel system for monitoring and inspection of the ILISD device detects, measures and reports temperature, presence of liquids, gas concentration, movements, torque and strain indicating potential failure of the connection. This system transmits localized information to the operator for each unit installed. The data is collected by and processed with warnings and instruction for further actions to maintain the pipeline integrity.

It is further intended that this novel method of the invention, its engineering and mechanics are applicable to specific requirements in a specific connection in a pipeline, and can be calculated in advance to demonstrate such function of the pipeline. A custom made ILISD device will allow for variable combination of the constructed elements.

Novelties of the Invention and Innovation

The current state of art in RTP connectors has no provision for the types of devices constructed in-connector, and in connection with pipelines, no provision for real time or periodic inspection of the structural health of, and no provision for real time communication between the connectors and the operator. The manufactured ILISD device is a readily available product with all monitoring components already built in, prefabricated and suitable for site installation by qualified operators.

The reference is noted that a prior art invention Smartpipe® is used in conjunction with the manufacturing of the ILISD product. The ILISD inventive system is suitable for reinforced thermoplastic composite pipelines and conduits. This novel method of ready-made ILISD device, has not been previously available in the industry.

The novelty of this inventive system is that the ILISD device structure and its component members are designed specifically for the inspection and monitoring of the connectors and related concentrated and combined stresses.

The novelty of the structure of the ILISD device is that it there are combinations of applicable covers, where the multi layers of the flexible RTP may be directly connected to the ILISD, and where the positioning of the casement is at critical points. The connection to the pipeline monitoring system and the connectors system will act both ways, in conjunction as an overall system and as a connector separate system. The types of monitoring systems may combine radio transmitters, near field wireless communication remote readers, direct wiring and other combinations.

The inventive ILISD system's data collection allows for the assessment of the condition of the connection to the pipeline showing the irregularities in operation. The operators would use the data to introduce measures to improve the connectors integrity in a pipeline's operation.

The novelty of this inventive ILISD system is in its advantage where composite pipeline's flexible relationship to the rigid connectors are a part of the RTP system of the pipe linings and new installations. The critical points of such connections are not monitored in today's composite pipeline industry.

The novelty of the invention is in the ability of the ILISD system to perform its function in separate and combined interactive work with the pipeline and it s connectors.

BACKGROUND OF THE INVENTION AND INNOVATION

The invention relates to the novel ILISD device made up of a casement shield with sensors in the assembly and the sleeves either with or without epoxy type material capable of establishing a secure connection between the connector and the RTP. The invention is a unique on-line movable with the pipeline monitoring device, and a measuring method in such application for pipelines that provides for detecting torsions, elongations, pulls and bending reactions immediately next to the connectors. The ILISD device is prefabricated, tested and stored, site delivered, and prepared for installation for both old and new pipelines.

The ILISD technology is made available in conjunction with the prior art for making composite pipelines.

This technology, as it relates to composite pipelines, is capable of accommodating the "C" formed sections as well as other patented cross sections, referenced here as "form shaped sections", and specifically noted in the Smartpipe® patents.

Spooled pipeline can also be equipped with the ILISD device, or ILISD device will be installed upon the completion of the connectors to the pipeline.

This inventive system of ILISD devices, is capable of being installed in a variety of ways. Possible types of installations include direct connection to connector, close proximity to the connector and a combination of close and direct connection locations for more accurately determining the behavior of the connected flexible composite pipeline affected by the various movements at the critical connection points.

DETAILED DESCRIPTION OF THE INVENTION

Figure 1:
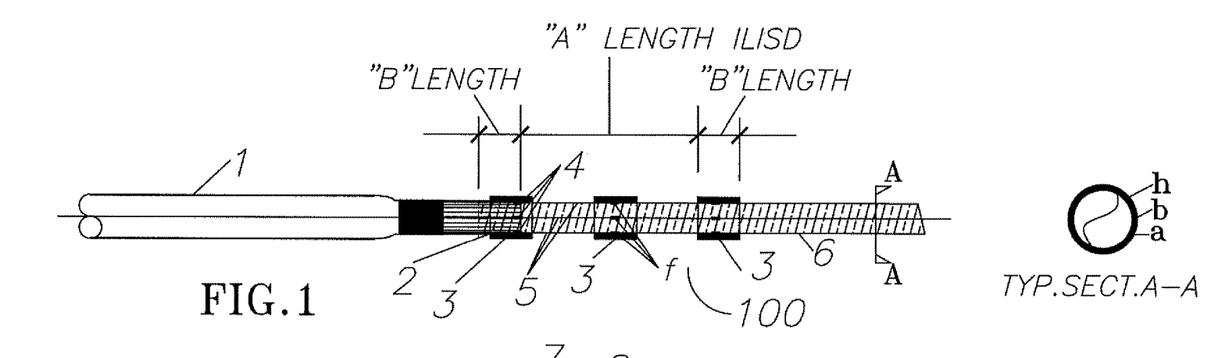
FIG. 1 shows a longitudinal view of the installation of an ILISD device connected to an composite RTP at its connection to a steel pipeline. Also shown is a typical cross section of the ILISD.

FIG. 1 shows a longitudinal view of the installation of an ILISD device 100 installed at the connection of a flexible RTP pipe 6 to an existing steel pipeline 1. The pipeline 1 is fitted with a connector 2 comprising a steel joint connected to the flexible pipe 6. The dimensions "A" and "B" are suitable dimensions for the various locations for the ILISD device 100 installation based on the design and demands for a pipeline. An arrangement is shown for casement shields 3 concentrically placed on and positively adhered to the outer surface of the flexible RTP pipe 6 with liquid type epoxy injection and curing to positively tie sensors 4 to the flexible RTP pipe 6. The sensors 4 are preinstalled to the casement shields 3 and connected to a response monitoring system for monitoring and regulating strain impact. The types of monitoring systems may combine radio transmitters, near field wireless communication remote readers, direct wiring and other combinations. A typical cross section represents a simplified composition of the RTP pipe 6. Also shown are ILISD sensors 5 connectors as fixated devices and part of the sensor assembly.

Also shown in FIG. 1 is a typical cross section of the RTP pipe 6 shown here as typical of Smartpipe® technology where the components are designated as follows:
 a. Corepipe;
 b. Wrapping layers;
 c. High strength pulling tapes with embedded woven fabric sensors;
 d. Tows with embedded woven fabric sensors;
 e. Covering assembly tapes, Mylar or other temporary security for pipe shape forming and installation;
 f. Fiber optic cables, sensors and readers for various pipeline functions.

Figure 2:
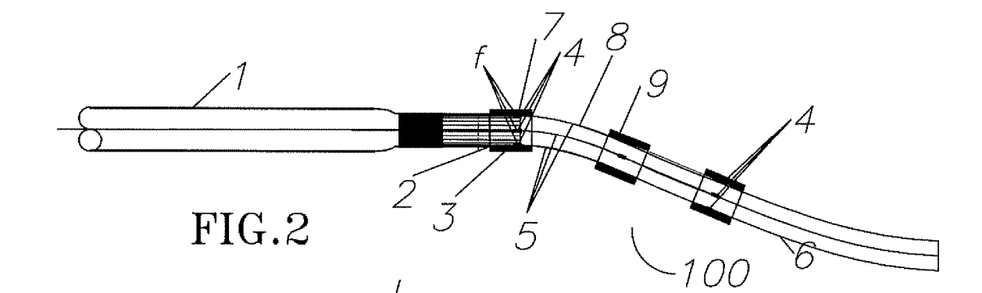
FIG. 2 shows a longitudinal view of the installation of an ILISD device with a bent section of a composite RTP.

In FIG. 2 a longitudinal view of the installation of an ILISD device installed on a bent section of a flexible RTP pipe 6 connected to an existing pipeline 1 is depicted to show flexibility of the casement shields 3 in adopting positions along the pipeline's profile. The first placed casement shield 3 shows the connectivity to the steel fitting 2 and the RTP joint at fixed point 7 that is the point of strain, rotation, and pulling out of the connector. This first shield 3 is attached firmly to the steel component and with the flexible component will measure all movements directly attributed to the most critical point 7 for the connector's function. Also shown are strain gages 8 connected with sensors 5.

Figure 3:
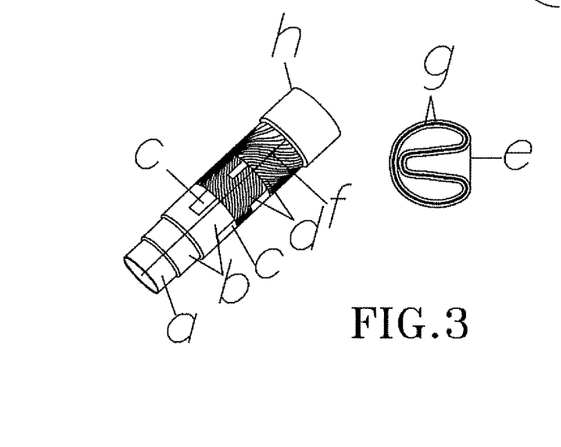
FIG. 3 is an isometric illustration of the RTP part upon which the ILISD device will be attached.

FIG. 3 is the isometric illustration of the RTP part upon to which the ILISD device will be attached. The drawing represents the Smartpipe® patented technology. Illustration shows a typical composite pipeline isometric detail with the components of the pipe construction including the monitoring systems, pulling systems, and other features of such composite pipe design as listed above in connection with FIG. 1. The typical cross section of the "shape formed" pipe is illustrated in "C" formation, among others previously patented.

Figure 4:
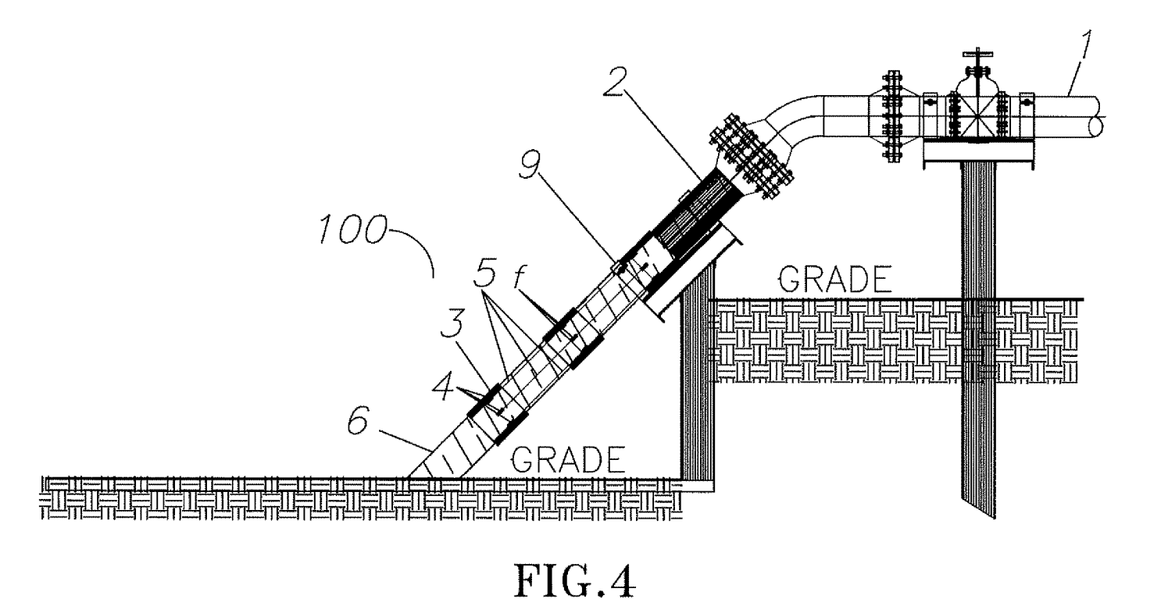
FIG. 4 is a depiction of an ILISD device engaged over a clamped section of RTP.

FIG. 4 shows a longitudinal view of the installation of an ILISD device 100 installed at the connection of a flexible RTP pipe 6 to an existing steel pipeline 1, with the full measuring ILISD device 100 engaged over several components of the pipeline, such as valves, expansion joints, and bends, in a complete monitoring of the critical installation as frequently found in the industry. A clamped connector 9a is shown. The ILISD device 100 is suitable for installation above ground as well as within the pipelines or on stand alone pipes.

Figure 5:
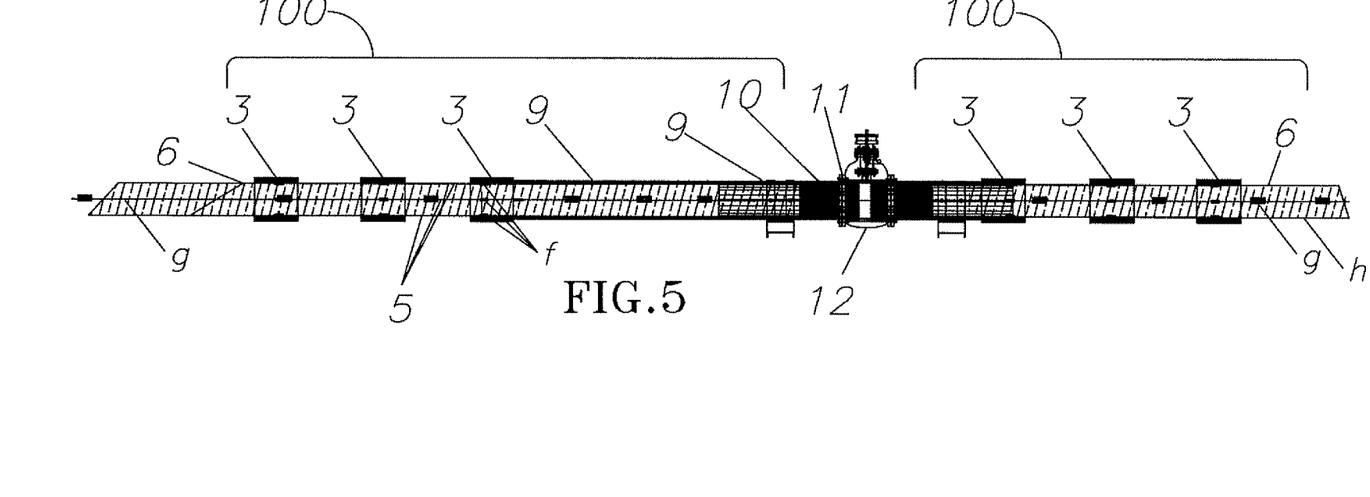
FIG. 5 is the longitudinal section showing the position of the ILISD device around a typical tap fitting (valve) formation in an RTP.

FIG. 5 is a longitudinal section showing the position of ILISD devices 100 around the installation of a tap fitting 12 in the pipeline 6, where the installation is mostly impact related from the inflow or other means of handling the fluids and gases in the pipeline 6. FIG. 5 illustrates both the inflow and outflow sides of a pipeline 6 where ILISD devices 100 cover connections at both inflow and outflow. The ILISD device 100 installation shows attachments to the pipeline 6 at both ends, and in the areas where an expanded metal sleeve is used as it may be required per design. FIG. 5 further illustrates the supports usually installed under the pipeline section and where such support serves as a foundation for the fittings and the ILISD device would also react to the movements of the supports relative to the straight line of the pipeline. These supports include welded flanges 11, a connector 10 with steel welded neck and a clamped sleeve connector 9a.

Figures 6, 7:
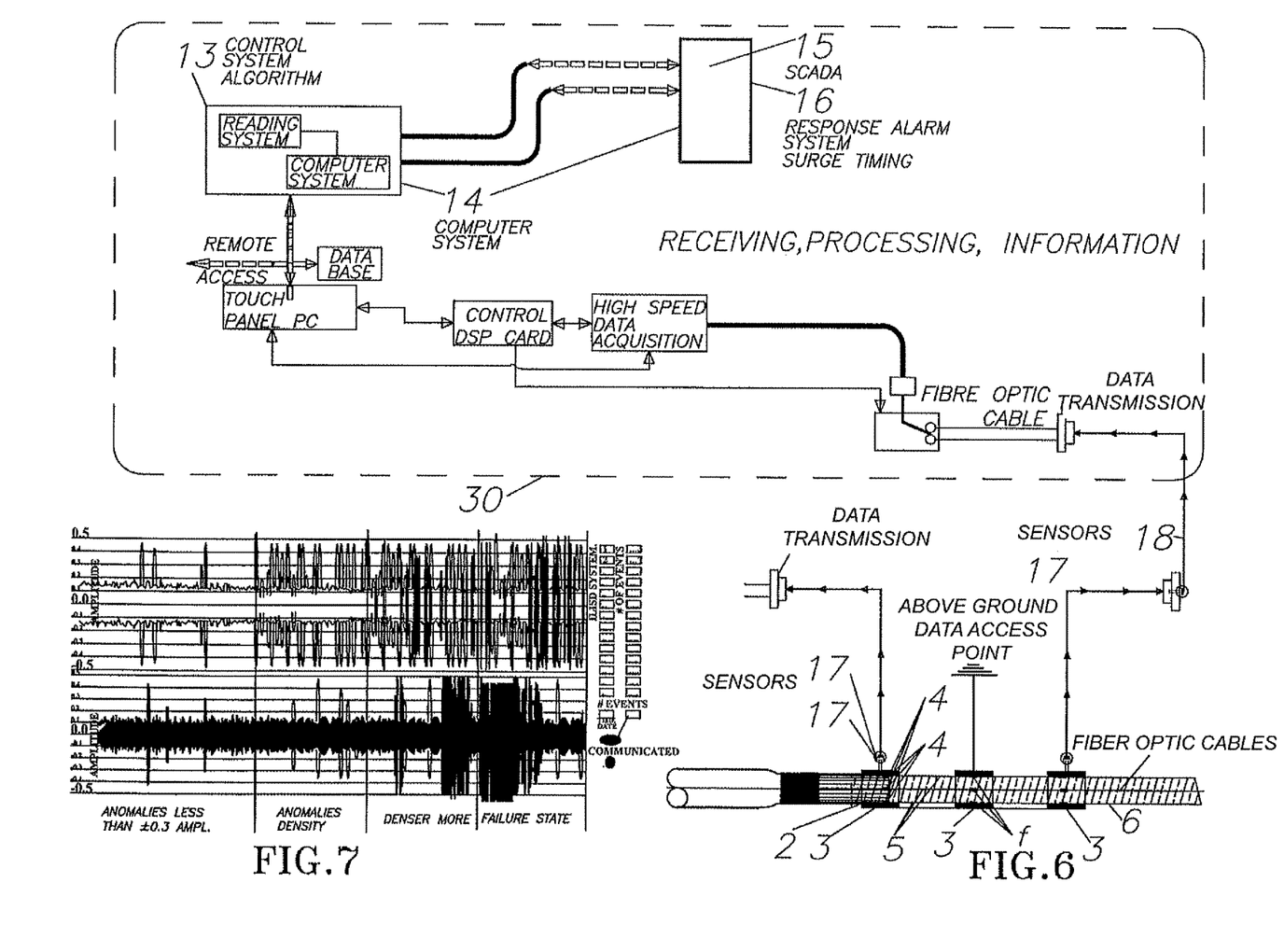
FIG. 6 is a depiction of the ILISD device with a preinstalled electronic mechanism where the information gathered from the connected ports, sensors, above ground data points or fiber optic cables and are processed via the Scada or other computerized means and are provided for the utilization in a standard operation of the pipeline
FIG. 7 is a graphical presentation of the stages of acoustical impact distinctly differentiating the stages of impact upon the connector and nearby pipe by showing abnormalities of the movements, which can be separated for each mode, rotation, displacement, and elongation and bending.

FIG. 6 is a depiction of the ILISD device with a preinstalled electronic mechanism where the information gathered at the connected ports are processed via the Scada or other computerized means and are provided for the utilization in a standard operation of the pipeline, where the declinations of the connectors are considered critical, and require an operator's intervention or a system automatic emergency procedure intervention if programmed so. This system of monitoring has several technological features where it could be combined with sensors, fiber optics and other means available in the contemporary technologies. It is also a feature of the connector system that is combined into the overall ILI system, and as such, it provides a total inspection and survey of the health of the pipeline in operation. Depicted is a block diagram 30 showing a computer system 14 for receiving, processing and transmitting information gathered at the connected ports for processing via Supervisory control and data acquisition (SCADA) 15 and response alarm system 16 for surge timing or other computerized means and are provided for the utilization in a standard operation of a pipeline and require an operator's intervention or a system automatic emergency procedure intervention if so programmed. Also shown are sensors 17, data transmission lines 18, and above ground data access points. As noted above, the types of monitoring systems may combine radio transmitters, near field wireless communication remote readers, direct wiring and other combinations.

FIG. 7 is a depiction of a graphical presentation of the stages of acoustical impact, indicating a pattern from which is signaled to the operator the state of the ILISD device itself at each unit separately, and where a full assessment of the connector is evaluated. The graphical presentation is distinctly differentiating the stages of the impact upon the connector and nearby pipe by showing abnormalities of the movements, which can be separated for each mode, rotation, displacement, and elongation and bending.

FIG. 8a is a depiction of the ILISD device 100 positioned as an abating device within the connector body with flexible seal grouting 19. C l amp s 21 are shown above the seal wrap 20 after epoxy type grouting. This can be partially manufactured with the flexible connector prior to mounting on the RTP. The entire assembly consists of the ILISD blanket type application ready to be seal grouted in a fixed position on the RTP.

Figure 8:
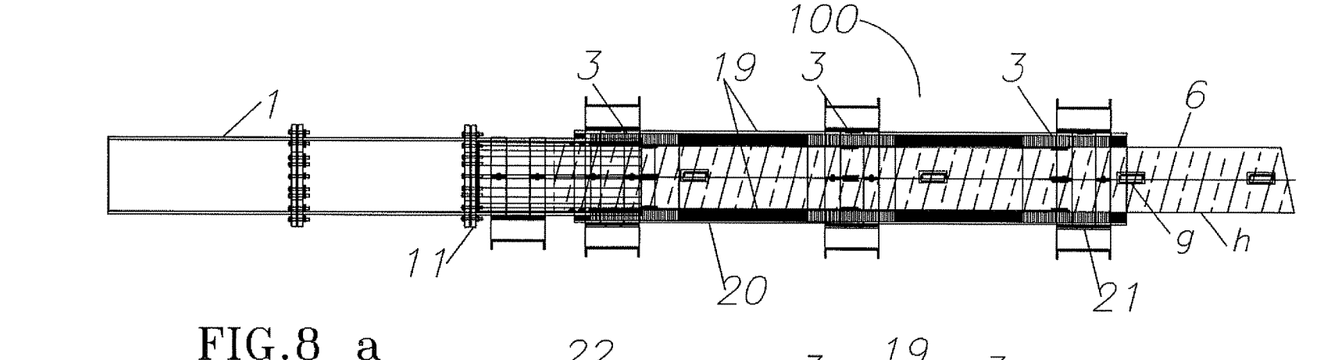
FIG. 8a is a depiction of the ILISD device positioned as an abating device within the connectors body.
FIG. 8b is a depiction of the ILISD device positioned as installed over the connector and clamped to the RTP after a grouted blanket is installed.

FIG. 8 b is a depiction of the ILISD device 100 as installed on the RTP 6 overlapping the connector at fixed point 22 after grouted blanket 19 is installed. This method allows for the installation of ILISD 100 at the RTP 6 in place without disturbance to the connectors.

Figures 8, 9:
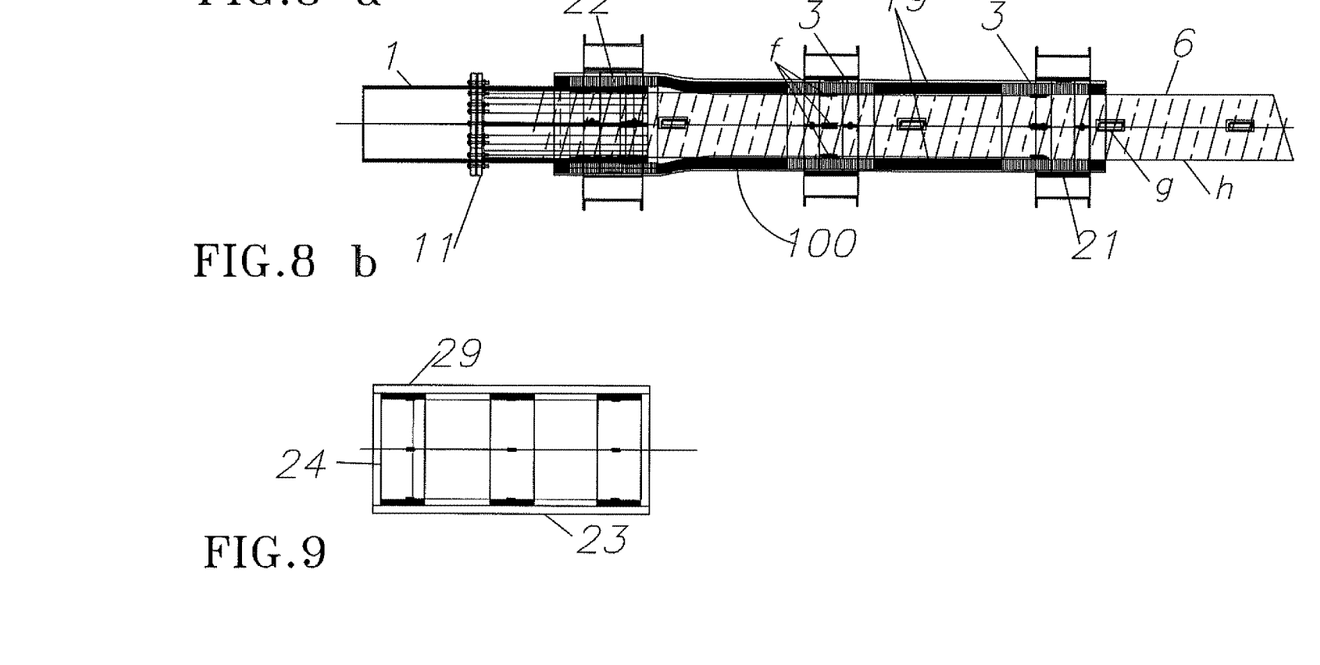
FIG. 9 is a depiction of the ILISD device with a preinstalled prefabricated blanket with sensors, and shields.

FIG. 9 is a depiction of an ILISD blanket 23 with preinstalled prefabricated blanket seal wrap with sensors, casement shields 24 and overlapping edges. The casement shield 24 is shown with liquid type epoxy injection after curing to positively tie the sensors to the RTP. The seal wrap annulus 25 is injected with epoxy type grout. Where the ILISD is concerned, flexible seal grouting is used to allow for the detection of RTP movement. Where the function of the ILISD is proposed to be a stiffener to offset the RTP to steel fitting connection the seal grouting will be a hardened epoxy material which will provide for a rigidly connected section.

Figure 10:
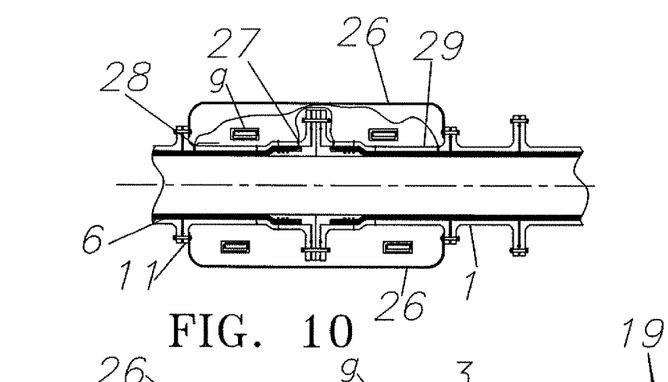
FIG. 10 is a depiction of the ILISD device with a prefabricated encapsulating assembly with sensors, as a shield for the protection and monitoring of the critical components built with the pipelines and subject to damages in the first place.

FIG. 10 is a depiction of the ILISD blanket system application with a prefabricated encapsulating assembly 26 with sensors, as a shield for the protection and monitoring of the critical components built with the pipelines and subject to damages. This encapsulating assembly 26 is a rigid type, made of steel or other types of the material suitable to provide the rigid cover. In FIG. 10, is shown a feed through connection 27 for a monitoring system, a pressure monitoring port 28, and an adaptor/spool piece 29 for Smartpipe® RTP.

Figure 11:
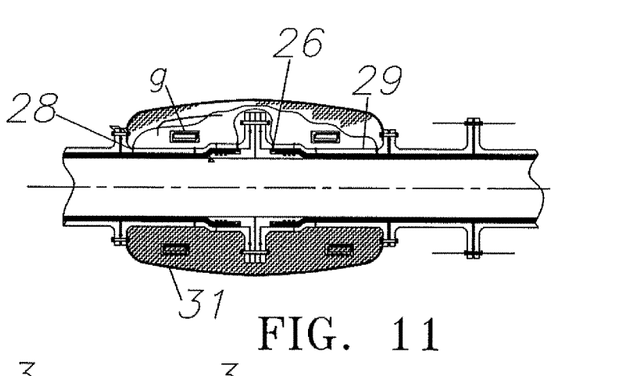
FIG. 11 is a depiction of the ILISD device with a prefabricated encapsulating assembly with sensors, as a shield for protection and monitoring of critical pipeline components subject to damages.

FIG. 11 is a depiction of the ILISD blanket system applicator with a prefabricated encapsulating assembly 31 with a prefabricated encapsulating assembly, as a shield for the protection and monitoring of the critical pipeline components subject to damages. This encapsulating assembly 31 is a flexible type with liquid type fill, made of composite materials or other flexible types of the materials.

Figure 12A:
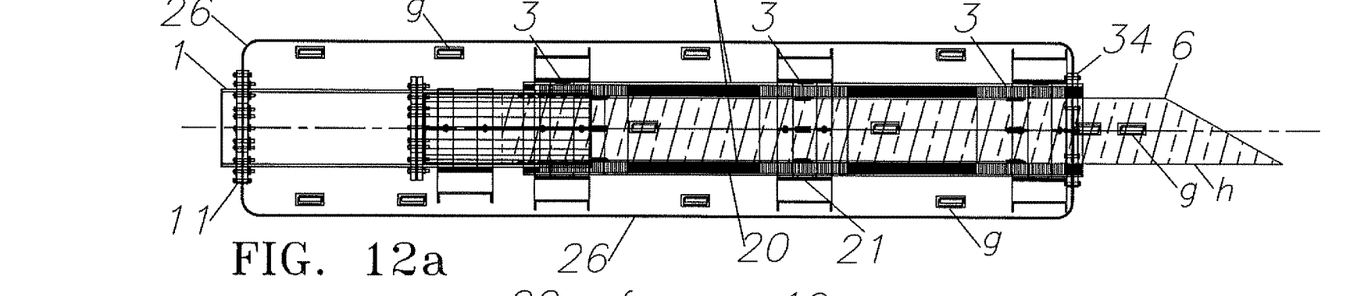
FIGS. 12a, 12b and 12c are depictions of the ILISD device with a prefabricated encapsulating assembly with sensors, as a shield for the protection and monitoring of the critical pipeline components showing longer covers of various fittings in the pipeline, the means of one type of assembly to put over the pipeline and to achieve a positive connection and encapsulation with the ILISD device.
Figure 12B:
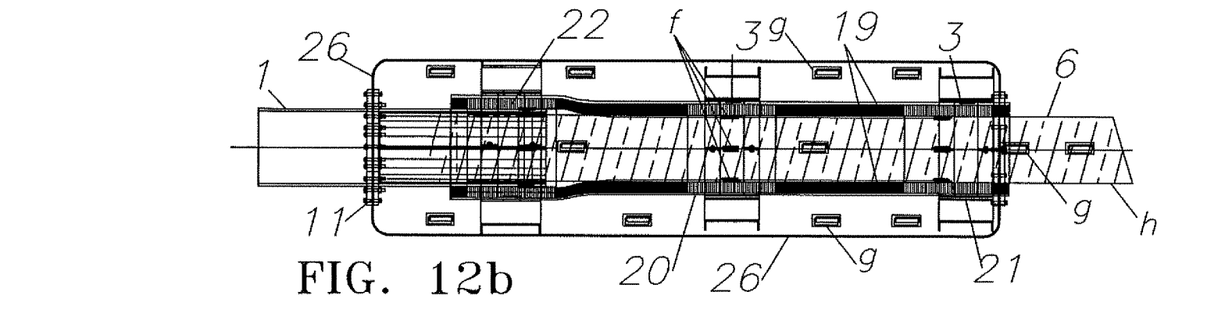
Figure 12C:
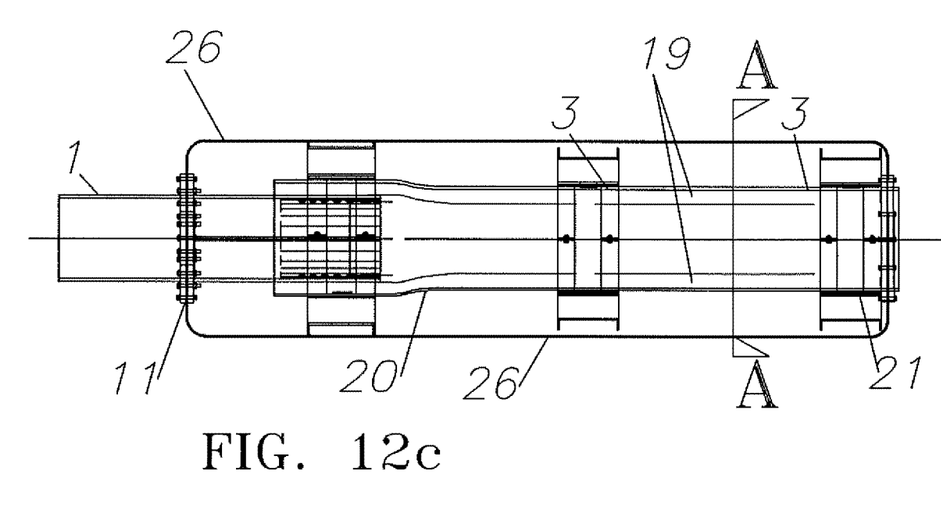

FIG. 12a.b.c. is a depiction of the ILISD blanket system applicator with a prefabricated encapsulating assembly 26 with sensors, as a shield for the protection and monitoring of the critical pipeline components showing a longer covers of various fittings in the pipeline, the means of one type of assembly to put over the pipeline and to achieve a positive connection and encapsulation with the ILISD product. In FIG. 12a a flanged connection 34 to the clamp 21 is shown. In FIG. 12c, an interior collar 31 is shown as well as a joint type 32 with variations and a split type connector 33 doubled to couple with the interior collar 31.

We claim:

1. A system to inspect and monitor stress, strain, leakage, corrosion and disjointing of rigid metallic and non-metallic connector fittings used to join sections of non-metallic flexible reinforced thermoplastic pipe (RTP), as well as inspecting and monitoring the structural health of the RTP in the area of those connections comprising:
  a. one or more casement shields concentrically mounted on and adhered with liquid type epoxy to the outer surface of the RTP at or adjacent to the connection with a rigid connector fitting;
  b. monitoring sensors installed in the casement shields, where said sensors are positively tied to the RTP by adherence of the casement shields to the outer surface of the RTP, and;
  c. a management system for receiving, processing and transmitting information gathered from the sensors via Supervisory Control and Data Acquisition (SCADA) or other computerized means for monitoring and regulating strain impact, determining stress level and direction, potential leaks and temperature spikes at connector fitting areas.

2. The system of claim 1 further comprising above ground access points and fiber optic cables for transmitting information gathered from the sensors to the management system by any combination of radio transmission, near field wireless communication remote readers, and direct wiring.

3. The system of claim 2 where the management system further comprises a mechanism for acoustical detection or simulation, where the mechanism conforms with the ability to form an acoustical signature in a graphical presentation of the stages of acoustical impact with a computer system for receiving, processing and transmitting information gathered from acoustical micro packs on the casement shields for processing via SCADA and response alarm system.

4. The system of claim 2 where the RTP is installed after a reduction in cross sectional shape.

5. The system of claim 2 further serving to abate the rigid connector fitting where more than one casement shields are installed as a blanket within a seal wrap on the outer surface of the RTP at or adjacent to the connection with a rigid connector fitting, with the seal wrap grouted in place and clamps installed outside the seal wrap at the location of the casement shields.

6. The system of claim 5 further comprising a prefabricated encapsulating assembly with sensors.

7. The system of claim 6 where the RTP further comprises; a core pipe, wrapping layers, high strength pulling tapes with embedded woven fabric sensors, tows with embedded woven fabric sensors, covering assembly tapes, sensors, and an inline inspection system connected to the management system.

8. A method to inspect and monitor stress, strain, leakage, corrosion and disjointing of rigid metallic and non-metallic connector fittings used to join sections of reinforced thermoplastic pipe (RTP), as well as inspecting and monitoring the structural health of the RTP in the area of those connections comprising the steps of:
  a. concentrically mounting and adhering with mechanical fasteners or liquid type epoxy at least one casement shield to the outer surface of the RTP at or adjacent to the connection with a rigid connector fitting;
  b. installing monitoring sensors in the casement shields, where said sensors are positively tied to the RTP by adherence of the casement shields to the outer surface of the RTP, and;
  c. transmitting information from the sensors to a management system for receiving, processing and transmitting information gathered from the sensors via Supervisory Control and Data Acquisition (SCADA) or other computerized means for monitoring and regulating strain impact, determining stress level and direction, potential leaks and temperature spikes at connector fitting areas.

9. The method of claim 8 where the RTP further comprises; a corepipe, wrapping layers, high strength pulling tapes with embedded woven fabric sensors, tows with embedded woven fabric sensors, covering assembly tapes, sensors, and an inline inspection system connected to the management system.

\* \* \* \* \*